United States Patent
Delaney et al.

(10) Patent No.: US 10,201,967 B2
(45) Date of Patent: Feb. 12, 2019

(54) SYSTEM AND METHOD FOR SECURING A DEVICE WITH A DYNAMICALLY ENCRYPTED PASSWORD

(71) Applicant: CTPG Operating, LLC, Ithaca, NY (US)

(72) Inventors: Robert Delaney, Ithaca, NY (US); Kyle Turner, Binghamton, NY (US)

(73) Assignee: CTPG OPERATING, LLC, Ithaca, NY (US)

( * ) Notice: Subject to any disclaimer, the term of this patent is extended or adjusted under 35 U.S.C. 154(b) by 0 days.

(21) Appl. No.: 14/633,844

(22) Filed: Feb. 27, 2015

(65) Prior Publication Data
US 2015/0248561 A1    Sep. 3, 2015

Related U.S. Application Data

(60) Provisional application No. 61/947,111, filed on Mar. 3, 2014, provisional application No. 61/947,121, filed
(Continued)

(51) Int. Cl.
| | |
|---|---|
| G06F 15/16 | (2006.01) |
| H04L 9/32 | (2006.01) |
| B41F 19/02 | (2006.01) |
| G06F 3/12 | (2006.01) |
| G06F 21/44 | (2013.01) |
| G06F 21/60 | (2013.01) |
| G06K 15/00 | (2006.01) |

(Continued)

(52) U.S. Cl.
CPC ............. *B41F 19/02* (2013.01); *B41J 2/325* (2013.01); *B41J 3/38* (2013.01); *G06F 3/1222* (2013.01);
(Continued)

(58) Field of Classification Search
CPC ........... G06F 3/12; G06F 3/1293; H04L 9/00; H04N 1/3232
(Continued)

(56) References Cited

U.S. PATENT DOCUMENTS

| | | |
|---|---|---|
| 4,638,340 A | 1/1987 | Iiyama |
| 4,827,425 A | 5/1989 | Linden |

(Continued)

FOREIGN PATENT DOCUMENTS

| | | |
|---|---|---|
| CN | 101105837 | 1/2008 |
| CN | 102509032 | 6/2012 |

(Continued)

OTHER PUBLICATIONS

Wilson, S., The "Security Printer" Model for CA Operations, Lockstep White Paper No. 3, Sep. 2005, pp. 1-7, Lockstep Consulting Pty Ltd.
(Continued)

*Primary Examiner* — Jason K Gee
*Assistant Examiner* — Dereena T Cattungal
(74) *Attorney, Agent, or Firm* — Bond Schoeneck & King, PLLC; George McGuire; Frederick Price

(57) ABSTRACT

The present invention relates to a system and method of securing a printer. The system includes a printer, having a nontransitory storage medium, configured to: store a password encrypted with a first encryption scheme; re-encrypt the stored password with a second encryption scheme upon a predetermined interval/event; receive a data stream from a host computer; determine whether the received data stream contains the password encrypted with the second encryption scheme; and print a document upon determining that the data stream contains the password encrypted with the second encryption scheme.

8 Claims, 5 Drawing Sheets

Related U.S. Application Data on Mar. 3, 2014, provisional application No. 61/947,135, filed on Mar. 3, 2014, provisional application No. 61/947,143, filed on Mar. 3, 2014, provisional application No. 61/947,152, filed on Mar. 3, 2014, provisional application No. 61/947,160, filed on Mar. 3, 2014, provisional application No. 61/947,174, filed on Mar. 3, 2014, provisional application No. 61/947,197, filed on Mar. 3, 2014, provisional application No. 61/947,206, filed on Mar. 3, 2014, provisional application No. 61/947,214, filed on Mar. 3, 2014.

(51) Int. Cl.
*H04N 1/00* (2006.01)
*G06K 15/02* (2006.01)
*H04N 1/32* (2006.01)
*B41J 2/325* (2006.01)
*B41J 3/38* (2006.01)

(52) U.S. Cl.
CPC .......... *G06F 3/1236* (2013.01); *G06F 3/1238* (2013.01); *G06F 3/1259* (2013.01); *G06F 3/1273* (2013.01); *G06F 3/1285* (2013.01); *G06F 3/1288* (2013.01); *G06F 3/1293* (2013.01); *G06F 3/1294* (2013.01); *G06F 21/44* (2013.01); *G06F 21/602* (2013.01); *G06F 21/608* (2013.01); *G06K 15/028* (2013.01); *G06K 15/4095* (2013.01); *H04N 1/00204* (2013.01); *H04N 1/3232* (2013.01); *H04N 2201/0082* (2013.01); *H04N 2201/3269* (2013.01)

(58) Field of Classification Search
USPC .......................... 713/194, 200, 183; 726/34
See application file for complete search history.

(56) References Cited

U.S. PATENT DOCUMENTS

| | | | |
|---|---|---|---|
| 5,512,977 A | 4/1996 | Imai | |
| 5,552,009 A | 9/1996 | Zager | |
| 5,619,026 A | 4/1997 | Chou | |
| 5,991,411 A | 11/1999 | Kaufman | |
| 6,196,459 B1 | 3/2001 | Goman | |
| 6,202,155 B1 | 3/2001 | Tushie | |
| 6,203,069 B1 | 3/2001 | Outwater | |
| 6,335,799 B1 | 1/2002 | Provost | |
| 6,362,869 B1 | 3/2002 | Silverbrook | |
| 6,362,893 B1 | 3/2002 | Francis | |
| 6,367,011 B1 | 4/2002 | Lee | |
| 6,390,377 B1 | 5/2002 | Dlugos | |
| 6,394,358 B1 | 5/2002 | Thaxton | |
| 6,396,594 B1 | 5/2002 | French | |
| 6,597,385 B2 | 7/2003 | Verdyck | |
| 6,650,430 B2 | 11/2003 | Francis | |
| 6,729,550 B2* | 5/2004 | Seita | G06K 7/0008 235/375 |
| 6,738,903 B1 | 5/2004 | Haines | |
| 6,750,985 B2 | 6/2004 | Rhoads | |
| 6,973,172 B1* | 12/2005 | Bitove | G06Q 20/04 379/114.19 |
| 6,985,600 B2 | 1/2006 | Rhoads | |
| 6,991,164 B2 | 1/2006 | Lemelson | |
| 7,025,269 B2 | 4/2006 | Marshall | |
| 7,099,026 B1 | 8/2006 | Hren | |
| 7,229,025 B2 | 6/2007 | Sussmeier | |
| 7,233,930 B1 | 6/2007 | Ryan, Jr. | |
| 7,284,279 B2 | 10/2007 | Morrison | |
| 7,286,150 B2 | 10/2007 | Hann | |
| 7,383,768 B2 | 6/2008 | Reichwein | |
| 7,460,252 B2 | 12/2008 | Campbell | |
| 7,535,586 B2 | 5/2009 | Kumashio | |
| 7,546,952 B2 | 6/2009 | Knowles | |
| 7,556,444 B2 | 7/2009 | Kurashina | |
| 7,588,188 B2 | 9/2009 | Knowles | |
| 7,614,560 B2 | 11/2009 | Knowles | |
| 7,691,280 B2 | 4/2010 | Waldrop | |
| 7,852,359 B2 | 12/2010 | Evans | |
| 7,958,359 B2 | 6/2011 | Sharma | |
| 8,033,477 B2 | 10/2011 | Jones | |
| 8,045,191 B2 | 10/2011 | Yamanaka | |
| 8,085,438 B2 | 12/2011 | Hersch | |
| 8,100,330 B2 | 1/2012 | Bulan | |
| 8,203,583 B2 | 6/2012 | Wilsher | |
| 8,240,797 B2 | 8/2012 | Haas | |
| 8,339,632 B2 | 12/2012 | Wasamoto | |
| 8,345,316 B2 | 1/2013 | Bradley | |
| 8,355,180 B2 | 1/2013 | Wu | |
| 8,395,646 B2 | 3/2013 | Yamamoto | |
| 8,402,371 B2 | 3/2013 | Tang | |
| 8,424,751 B2 | 4/2013 | Liu | |
| 8,481,108 B2 | 7/2013 | Roth | |
| 8,496,186 B2 | 7/2013 | Ito | |
| 8,551,387 B2 | 10/2013 | Feldman | |
| 8,593,696 B2 | 11/2013 | Picard | |
| 8,687,241 B2 | 4/2014 | Simske | |
| 8,736,897 B2 | 5/2014 | Pierce | |
| 8,826,004 B2 | 9/2014 | Euchner | |
| 2002/0042884 A1* | 4/2002 | Wu | G06F 21/645 726/10 |
| 2002/0051167 A1 | 5/2002 | Francis | |
| 2003/0081247 A1* | 5/2003 | Sharma | G06F 21/608 358/1.15 |
| 2003/0088160 A1 | 5/2003 | Halleck et al. | |
| 2003/0145218 A1 | 7/2003 | Hutchison | |
| 2004/0050936 A1 | 3/2004 | Look | |
| 2004/0179078 A1 | 9/2004 | Gundjian | |
| 2005/0102241 A1* | 5/2005 | Cook | G06Q 20/04 705/64 |
| 2005/0149736 A1* | 7/2005 | Kim | H04L 9/3226 713/177 |
| 2006/0037065 A1 | 2/2006 | Ekers | |
| 2006/0044589 A1 | 3/2006 | Nakagawaji | |
| 2006/0212715 A1 | 9/2006 | Terao | |
| 2007/0091377 A1 | 4/2007 | Smith | |
| 2007/0103536 A1 | 5/2007 | Fujimaki | |
| 2007/0223955 A1* | 9/2007 | Kawabuchi | G03G 21/04 399/80 |
| 2008/0168554 A1 | 7/2008 | Kim | |
| 2009/0086967 A1 | 4/2009 | Ozawa | |
| 2010/0012736 A1 | 1/2010 | Wilds | |
| 2010/0034383 A1* | 2/2010 | Turk | H04L 41/0816 380/262 |
| 2010/0042846 A1* | 2/2010 | Trotter | G06F 21/31 713/182 |
| 2010/0071077 A1 | 3/2010 | Morris | |
| 2010/0108874 A1 | 5/2010 | Zahedi | |
| 2011/0016388 A1 | 1/2011 | Tang | |
| 2011/0045256 A1 | 2/2011 | Luther | |
| 2011/0123132 A1 | 5/2011 | Schneck | |
| 2012/0144466 A1* | 6/2012 | Ohkado | G06F 21/33 726/6 |
| 2012/0174211 A1 | 7/2012 | Suzuki | |
| 2012/0176651 A1 | 7/2012 | Pham | |
| 2012/0219151 A1* | 8/2012 | Mano | G06F 3/12 380/51 |
| 2013/0015236 A1 | 1/2013 | Porter | |
| 2013/0141755 A1 | 6/2013 | Miller | |
| 2013/0215474 A1 | 8/2013 | Caton | |
| 2013/0320099 A1 | 12/2013 | Acton | |
| 2014/0002586 A1 | 1/2014 | Zehler | |
| 2014/0185800 A1 | 7/2014 | Fallon | |
| 2014/0233053 A1 | 8/2014 | Kakutani | |
| 2015/0248550 A1* | 9/2015 | Alshinnawi | G06F 21/31 726/19 |

FOREIGN PATENT DOCUMENTS

| | | |
|---|---|---|
| CN | 102658739 | 9/2012 |
| JP | 2003334997 | 11/2003 |

(56) References Cited

FOREIGN PATENT DOCUMENTS

| JP | 2005202553 | 7/2005 |
|----|------------|--------|
| JP | 2007058535 | 3/2007 |
| KR | 20040099065 | 11/2004 |
| KR | 20040100540 | 12/2004 |
| WO | 2005051676 | 6/2005 |
| WO | 2009106107 | 9/2009 |

OTHER PUBLICATIONS

Security Printing and Seals, Chapter 14, pp. 433-455.
Simske, S., Aronoff, J., Sturgill, M., Security Printing Deterrents: A Comparison of Thermal Ink Jet, Dry Electrophotographic, and Liquid Electrophotographic Printing, Journal of Imaging Science and Technology, 2008, vol. 52(5).
Jordan, F., Yribar, J., Turning Your Smartphone Into an Authentication Device, International Pharmaceutical Industry, 2013, pp. 104-112, vol. 5, Issue 3.
Lexmark Cutting-Edge Security for Printers and MFPs brochure, Lexmark, 2011.
Hattersley, J., Invisible and Fluorescing Bar Code Printing and Reading, InData Systems, Industrial Data Entry Automation Systems Incorporated, pp. 1-12.
Digital Printing Security Solutions, Best Practices, Kodak, 2011.
Extend Labeling Control Beyond the Enterprise, http://www.nicelabel.com/products/powerforms-web, Jun. 25, 2014.
Security Features of Lexmark Laser Printers: Overview, Technical White Paper, Lexmark, copyright 2005.
PCT International Search Report for International Application No. PCT/US2015/018033 dated Apr. 20, 2016.

\* cited by examiner

SYSTEM AND METHOD FOR SECURING A DEVICE WITH A DYNAMICALLY ENCRYPTED PASSWORD

RELATED APPLICATION DATA

The present application claims priority to and the benefit of U.S. provisional patent application No. 61/947,111, filed on Mar. 3, 2014; U.S. provisional patent application No. 61/947,121, filed on Mar. 3, 2014; U.S. provisional patent application No. 61/947,135, filed on Mar. 3, 2014; U.S. provisional patent application No. 61/947,143, filed on Mar. 3, 2014; U.S. provisional patent application No. 61/947,152, filed on Mar. 3, 2014; U.S. provisional patent application No. 61/947,160, filed on Mar. 3, 2014; U.S. provisional patent application No. 61/947,174, filed on Mar. 3, 201; U.S. provisional patent application No. 61/947,197, filed on Mar. 3, 2014; U.S. provisional patent application No. 61/947,206, filed on Mar. 3, 2014; and U.S. provisional patent application No. 61/947,214, filed on Mar. 3, 2014, the entire contents of which are hereby incorporated by reference.

FIELD OF THE INVENTION

The present invention relates to printers capable of printing security features on a media substrate and, more particularly, to a system and method for securing printers capable of printing security features on a media substrate by utilizing a dynamically encrypted password, which can change the encryption at predetermined intervals/events, and optionally locks the printer if a new password or the password with a new encryption is not received upon a predetermined interval/event.

BACKGROUND

Security documents are used across a diverse marketplace to deter fraud, counterfeiting and theft. In most cases, the security documents are pre-printed on media. The pre-printed media must be stored in a secure location so that counterfeiters and thieves are not able to obtain the secure media which would allow them to freely print fraudulent documents.

There are printers that can print these secure patterns on demand on standard media. In brief, security printing relates to the practice of manufacturing media substrate with certain security indicia/features to prevent forgery and counterfeiting of items such as passports, checks, and prescription pads. As should be understood by those of ordinary skill in the art, security printing can include, for example, the inclusion of watermarks, UV coatings, security fibers, microprinting, holograms, phosphorescent inks, and pantographs (e.g., "void") etc. in the manufacture of the media substrate. The advantage of these "security printers" is that standard media does not have to be secured from theft as the secure documents can be created on demand. However, the printer must be set up with features/methods that disable printing of these secure patterns if a thief were to steal the printer.

Security printers, being capable of producing a wide variety of official documents, are targets for counterfeiters, desiring the ability to print official documents. Accordingly, there is a need in the art to secure such printers against unauthorized users.

SUMMARY OF THE INVENTION

The present invention recognizes that security printers are potential targets for counterfeiters and need to be secured against an unlicensed user. Accordingly, various embodiments are directed to a printer and host computer, each storing a dynamically encrypted password, the encryption changing after a predetermined interval. Wherein the printer will only print per instructions/commands from a host computer which first sends the password with the current encryption scheme. Further embodiments are directed to a printer, configured to receive a new password from a host computer at a set interval. If the printer does not receive the password after the set interval, it will not print a secured pattern.

According an aspect, a system for securing a printer, comprises: a printer, having a nontransitory storage medium, configured to store a password encrypted with a first encryption scheme; re-encrypt the stored password with a second encryption scheme upon a predetermined event; receive a data stream from a host computer; determine whether the received data stream contains the password encrypted with the second encryption scheme; and print a document upon determining that the data stream contains the password encrypted with the second encryption scheme.

According to an embodiment, the system further comprises: a host computer, having a nontransitory storage medium, configured to: store the password encrypted with the first encryption scheme; re-encrypt the stored password with the second encryption scheme upon the passage of the predetermined interval; transmit the data stream to the printer, wherein the data stream contains the password encrypted with the second encryption scheme.

According to an embodiment, the system is further configured to lock at least one function of the printer if a second password is not received prior to the passage of a second predetermined interval.

According to an embodiment, the system the system of claim 3, further comprises: a host computer, having a nontransitory storage medium configured to generate the second password; and transmit the second password to the printer 100 upon the passage of the second predetermined interval.

According to an embodiment, the predetermined event is the passage of a period of time.

According to an embodiment, the predetermined event is reception of a command.

According to an embodiment, the command is received from the host computer, wherein the command further contains the first encrypted password.

According to an embodiment, the predetermined interval is determined by a user.

According to another aspect, a system for securing a printer, comprising: a printer, having a nontransitory storage medium, configured to: store a password; and lock at least one function of the printer if a second password is not received from a host computer prior to the passage of a predetermined interval.

According to an embodiment, the system further comprises: a host computer, having a nontransitory storage medium, configured to: generate the second password and transmit the second password to the printer prior to the passage of the passage of the predetermined interval.

According to an embodiment, the system, wherein the printer is further configured to lock at least one function of the printer if the second password is not received from a computer after the passage of a second predetermined interval.

According to an embodiment, the system, wherein the locked function is the ability to print a security pattern.

According to another aspect, a system for securing a printer, comprising: a printer, having a nontransitory storage medium, configured to: store a password; store an encryption key configured to decrypt a first encryption; replace the encryption key with a second encryption key, configured to decrypt a second encryption, upon the occurrence of a predetermined event; receive a data stream from a host computer containing an encrypted password; decrypt the received password with the second encryption key; print upon determining that the data stream contains the password encrypted with the second encryption scheme.

According to an embodiment, the system further comprises: a host computer, having a nontransitory storage medium, configured to store the password encrypted with the first encryption scheme; re-encrypt the stored password with the second encryption scheme upon the passage of the predetermined interval; transmit the data stream to the printer, wherein the data stream contains the password encrypted with the second encryption scheme.

According to an embodiment, the printer is further configured to lock at least one function of the printer if a second password is not received prior to the passage of a second predetermined interval.

According to an embodiment, the system further comprises: a host computer, having a nontransitory storage medium configured to: generate the second password and transmit the second password to the printer upon the passage of the second predetermined interval.

According to an embodiment, the predetermined event is the passage of a period of time.

According to an embodiment, the predetermined event is reception of a command.

According to an embodiment, the command is received from the host computer, wherein the command further contains the first encrypted password.

According to an embodiment, the predetermined interval is determined by a user.

In accordance with a preferred embodiment of the present invention, a specialized improved computer system is created—here the devices and/or systems that are specifically structured, configured, connected, and/or programmed to store a dynamically encrypted password, which can change the encryption at predetermined intervals/events, and optionally locks the printer if a new password or the password with a new encryption is not received upon a predetermined interval/event. This dynamically encrypted password, the encryption of which can change at a predetermined interval/event, makes it harder for a unauthorized user to user the printer for unauthorized reproduction of secure documents.

The data transmission, communication, and any control signals between the at least one host computer and the printer are sent and received pursuant to wired or wireless communication. The wireless communication/transmission can be over a network, which can be any suitable wired or wireless network capable of transmitting communication, including but not limited to a telephone network, Internet, Intranet, local area network, Ethernet, online communication, offline communications, wireless communications and/or similar communications means. The wireless transmission can be accomplished through any wireless protocol/technology, including, but not limited to, ZigBee standards-based protocol, Bluetooth technology, and/or Wi-Fi technology. Further, this data can be encrypted as needed based on the sensitivity of the data or the location the printer, for example. The devices can be located in the same room, in a different room in the same building, and/or in a completely different building and location from each other. A user using a host computer (or a different computer) can send data transmission, control or communication signals to the printer perform any of the functionalities described herein.

BRIEF DESCRIPTION OF THE DRAWINGS

The present invention will be more fully understood and appreciated by reading the following Detailed Description in conjunction with the accompanying drawings, in which.

DETAILED DESCRIPTION

Figure 1:
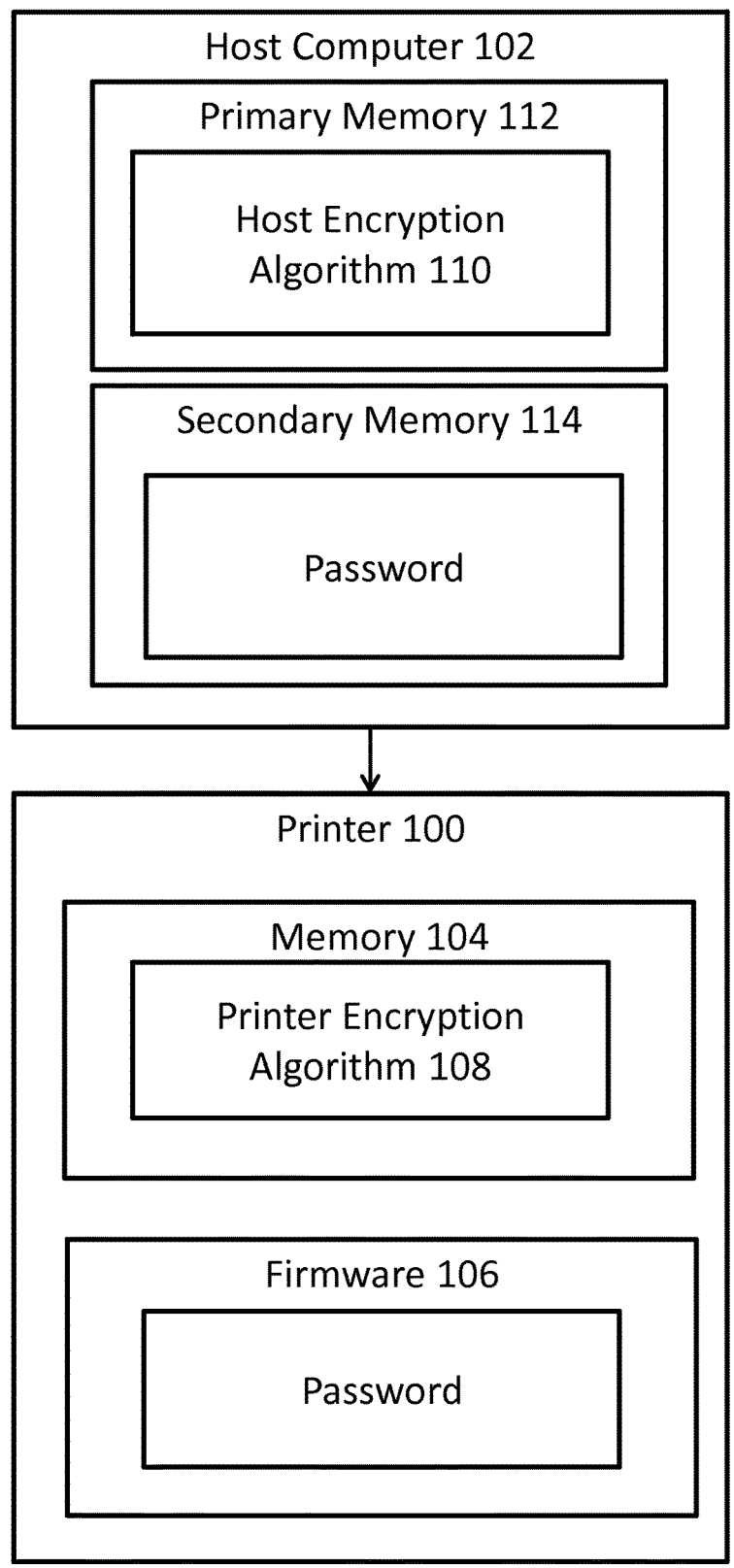
FIG. 1 is a system architecture diagram of a printer that is in communication with a host computer, according to an embodiment of the present invention.

The present invention will be more fully understood and appreciated by reading the following Detailed Description in conjunction with the accompanying drawings, wherein like reference numerals refer to like components.

Embodiments of a thermal printer, examples of which can be used as the printer in conjunction with embodiments of the methods and systems described herein and shown in the referenced Figures, exist and are possible. Applicant hereby incorporates by reference the embodiments of thermal printer 104 disclosed in paragraphs [0010]-[0014] and [0028]-[0031] and FIGS. 1-4 of U.S. Pat. Application Publication Number 2015/0009271, entitled "System and Method of Thermal Printing Security Features." The thermal printer can be connected, configured, programmed and/or structured to perform the functions of a printer described herein.

Embodiments of a thermal transfer printer, examples of which can be used as the printer in conjunction with embodiments of the methods and systems described herein and shown in the referenced Figures, exist and are possible. The thermal transfer printer can be connected, configured, programmed and/or structured to perform the functions of a printer described herein.

Even though thermal printers and thermal transfer printers are specifically referenced and described in certain embodiments herein, other digital printers and corresponding appropriate media substrates are contemplated to be part of the systems and methods described herein.

Turning to FIG. 1, a system architecture diagram of a thermal printer 100 that is structured, configured, and/or programmed to print security features such as pantographs, watermarks, and microprinting on a thermal media substrate (not shown), and can have various communication links to a computer 102, according to an embodiment of the present invention is shown. A user using the computer 102 (or a different computer 102) can instruct the thermal printer 100 to print a particular pre-stored security feature (e.g., a particular pantograph loaded in memory of the thermal printer 100) on a thermal media substrate, and to merge the particular security feature with variable data.

The thermal printer 100 can include a memory 104 that can store at least one security feature and preferably, a plurality of security features, and firmware 106 that can be programmed to print the at least one security feature, and preferably, the plurality of security features on demand that are stored in the memory, and to merge the security feature(s) with variable data (such as receipt, check, or prescription data, for example, as should be understood by those of skill in the art) preferably in real time depending on the particular application. The firmware 106 and memory 104 can have wired/wireless communication connections to the computer 102. In an alternative embodiment, the security feature (such as a pantograph) can be stored, updated, etc. on the computer 102.

In accordance with an embodiment, the printer 100 needs to receive a correctly encrypted password from a host computer 102 in order to print a document with security features as described herein. In another embodiment, the printer 100 also includes an encrypted key that is stored in its memory 104 (upon manufacture or provided to it post manufacture per connection with another device, such as host computer 102 or manually programmed into the printer memory 104). This encrypted key can be required to obtain access to parts of the printer memory 104 which store (or can store upon receipt from the host computer 102, for example) the plurality of security features as described herein, prior to being able to print the same (a user needs to be able to obtain access to such security features before one can print the same).

Figure 2:
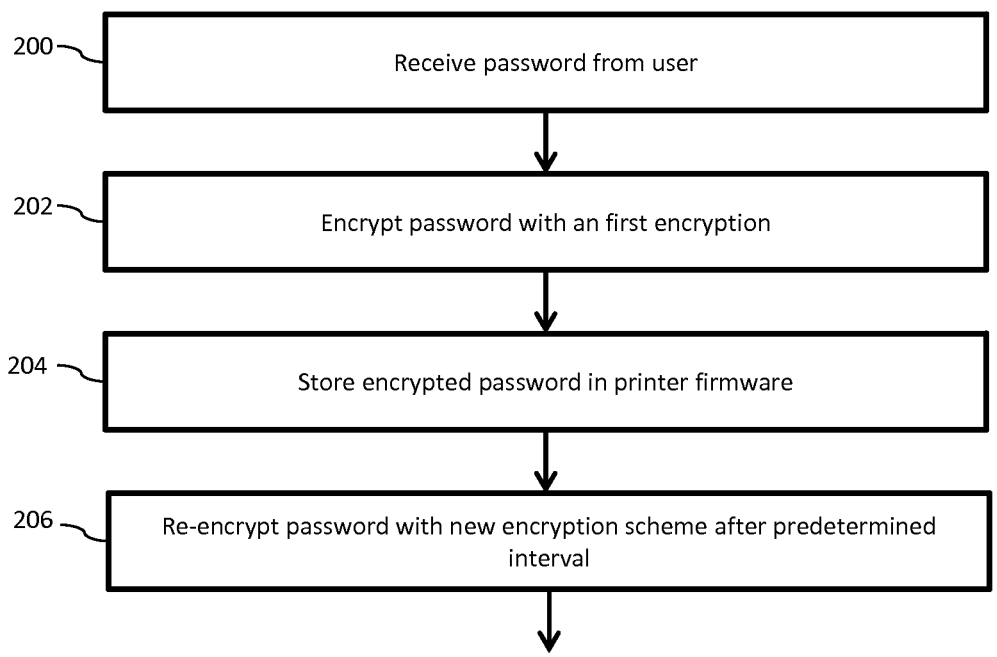
FIG. 2 is a flowchart of a method according to an embodiment of the present invention.

Memory 104 may also store a printer encryption algorithm 108, that, when run, implements the steps shown in FIG. 2, according to an embodiment, which can result in storage of an encrypted password in printer firmware and allow for re-encryption of the password with a new encryption scheme after a predetermined interval. In step 200, printer 100 receives a password from a user. The password may be received via host computer 102 or by another means of communication with printer 100, such as a by another computer 102 or computing device. Accordingly, the password may be received via an internet connection (wired or wireless) or by a hard connection to printer 100, such as through a cable. The password may be received upon initial configuration of the printer 100, such as when the printer 100 first receives a key from a user to initially unlock printer 100, or at another time according to alternative embodiments. In an alternative embodiment, the printer 100 may generate a random or pseudorandom password, instead of received from a user or other device. In this embodiment, it may be necessary for printer 100 to transmit the generated password to host computer 102 or other device outside the printer so that the password can be identified. In yet another embodiment, printer encryption algorithm 104 may be preprogrammed with an initial password. The initial password may be unique to the particularly printer 100 and stored upon manufacture, or otherwise when the algorithm is installed.

In step 202, the password is encrypted with an encryption scheme. Any encryption scheme known in the art sufficient for securing the password may be used. In step 204, the now encrypted password may be stored in firmware 106, according to an embodiment. Alternatively the encrypted password may be stored in running memory, or in primary memory for quick access. The initial encryption may be preprogrammed by an algorithm, or may be received from host computer 102 otherwise selected by a user or other device.

In step 206 the received password may be re-encrypted with the new encryption, upon the occurrence of a predetermined event. One of ordinary skill will understand that the new encryption may be same the type of encryption as the first type, only requiring a different decryption key. Alternately, the password may be re-encrypted with an entirely new kind of encryption. The predetermined event may be the passage of a predetermined period of time. For example, the password may be re-encrypted every hour, or half-hour, or every five minutes. In this embodiment, the time interval may be selected by the user. In order to determine passage of a time interval, the printer 100 may have an internal clock, or counter. Alternatively, the printer 100 may access an external clock or timer, such as over the internet. The interval that the password changes may not be periodic, but may vary. For example, the password may be re-encrypted after a ten minute interval, then at a five minute interval, then at a thirteen minute interval etc. Even where a password is set to change at varying intervals, it may be capped beneath a certain time limit. For example, the password may change at varying times, each time shorter than thirty minutes.

The encryption may also change upon the command of a user, or device. For example, a data stream received from host computer 102 may direct printer 100 to adopt a new encryption or new predetermined interval. The data stream may contain the key to the new encryption, or code to direct printer 100 which encryption scheme to adopt, or other data directing printer 100 to adopt a different encryption scheme. To ensure that an unauthorized user is not attempting to change the encryption, the data stream selecting the new encryption scheme may contain the current encrypted password. This process will be discussed in depth below. Furthermore, the encryption may change upon several events, such either a time interval or a command. Alternately, the encryption may change upon the combination of events, such as upon a command and within a predetermined interval of time.

Figure 3:
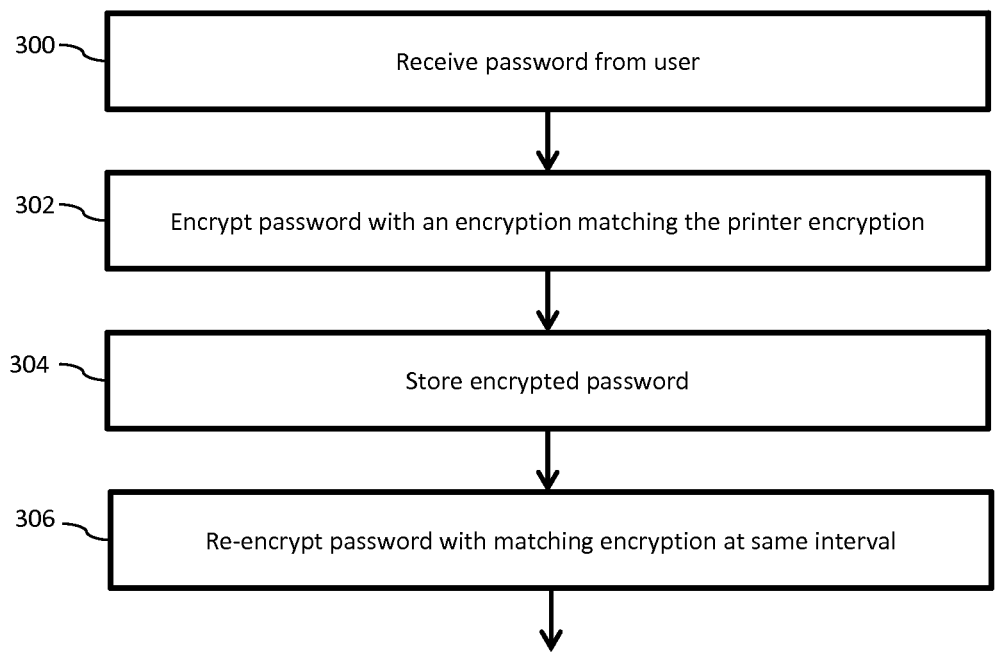
FIG. 3 is a flowchart of a method according to an embodiment of the present invention.

Returning to FIG. 1, host computer 102 may run a similar encryption algorithm in primary memory. FIG. 3 shows the steps implemented by host encryption algorithm 110, according to an embodiment.

Turning to FIG. 3, in step 300, host computer 102 receives a password from a user (or, alternatively, from the printer or other device). This password is the same password stored on printer 100. This password may be received upon configuration of the printer 100, or through the same means that the printer 100 received the password initially. Alternatively, the computer 102 may generate the password according to methods known in the art. If host computer 102 generates the password, it is necessary that it transmits the password to printer 100. Conversely, if printer 100 generates the password, it is necessary that it transmits the password to computer 102. This may be done upon configuration of the printer 100 or at another time as will be discussed below. In yet another embodiment, the host encryption algorithm 110 may be preprogrammed with the same initial password as printer 100.

In step 302 the password is encrypted with the same encryption with which password stored on printer 100 is encrypted. The encryptions may be made to match through communication between host computer 102 and printer 100, upon configuration of the printer 100, or at some other time. For example, as discussed above, the encryptions may be selected via a data stream between host computer 102 and printer 100, containing an encryption key or other code to direct printer 100 on what new encryption to adopt. The data stream may contain a product key or other a-priori selected password to prevent spoofing. Alternately, the printer 100 may send a data stream to host computer 102 to select the initial encryption. In yet another embodiment, the host computer 102 algorithm may be programmed to select a first encryption.

In step 304, the encrypted password is stored. In an exemplary embodiment, the encrypted password is stored in secondary memory 114. However, in an alternate embodiment the encrypted password may be retained in primary memory 112.

In step 306, the stored password may be re-encrypted with a new encryption, matching the printer 100 re-encryption, upon the occurrence of a predetermined event. The predetermined event may be the passage of a predetermined period of time (or other predetermined event/intervals). For host computer 102 may be synched with printer 100 such that they switch to a new encryption at the same moment. This may be accomplished by implementing a counter on both host computer 102 and printer 100 such that they change to a new encryption when counter reaches a certain number. Alternately, both the host computer 102 and printer 100 may be connected to an external clock such that they implement the new encryption at the same time. Other methods of synching the printer 100 and host computer 102 such that they adopt the new encryption at the same time is contemplated herein and should be appreciated by a person of ordinary skill in the art in conjunction with a review of this disclosure.

As mentioned above, the predetermined event may also be a command. The command may originate from a user. For example, the host computer 102 could be configured to adopt a new encryption (together with printer 100) every time the user commands host computer 102 to print a security pattern.

As described above, the new encryption may be coded into printer 100 algorithm 108 and host computer 102 algorithm 110 such that the printer 100 and computer 102 each adopt the new encryption. Alternatively the new encryption may transmitted to the host computer 102 from printer 100 or from host computer 102 to printer 100 via a data stream. In accordance with an embodiment, a data stream selecting a new encryption scheme can require the current encrypted password or some other security measure to prevent spoofing.

Figure 4:
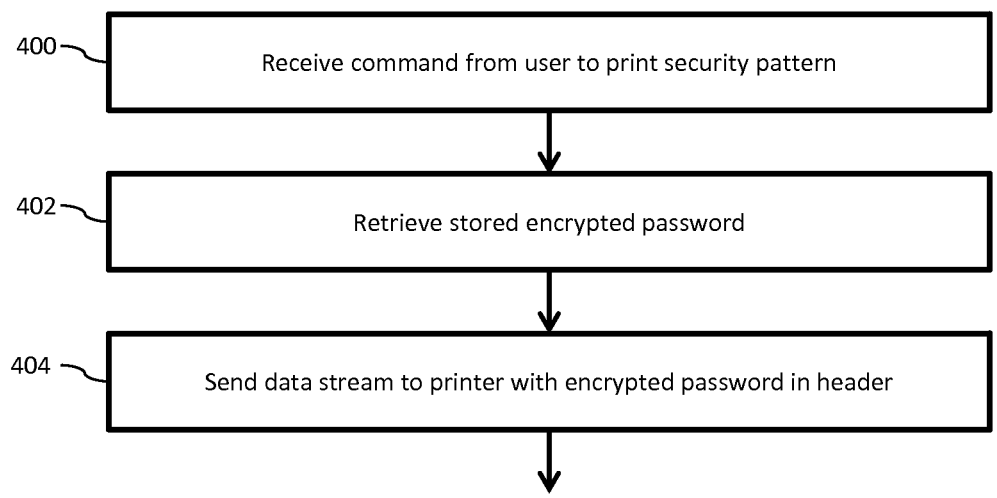
FIG. 4 is a flowchart of a method according to an embodiment of the present invention.

FIG. 4 shows a method of printing according to an embodiment. In step 400, host computer 102 receives from a user a command to print a document (likely having a security feature). In step 402, host computer 102 retrieves the password, with the current encryption from memory. And in step 404 host computer 102 sends a data stream, directing printer 100 to print, the data stream including the encrypted password. In an exemplary embodiment, the data stream may contain the encrypted password in the header of the data stream.

Figure 5:
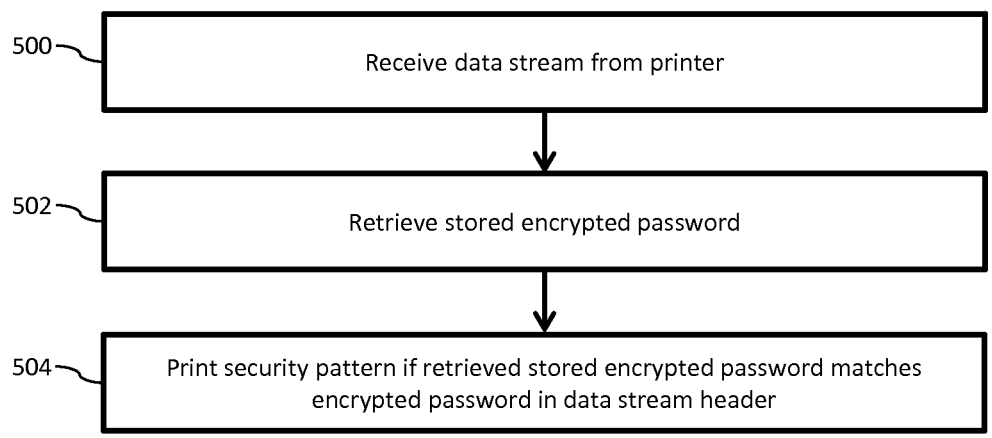
FIG. 5 is a flowchart of a method according to an embodiment of the present invention.

FIG. 5, shows a method of receiving a command to print, according to an embodiment. In step 500, the data stream is received from host computer 102 directing printer 100 to print a document. In step 502, printer 100 retrieves the encrypted password (stored on the printer 100 in, e.g., firmware 106), and in step 504 compares the stored encrypted password to the encrypted password in the received data stream. If the encrypted password matches the encrypted password in the data stream, the printer 100 prints the document as directed. If the encrypted passwords do not match, the printer 100 will not print. Note, that the encrypted passwords need not necessarily be decrypted; only compared in their encrypted form. In alternate embodiment, both passwords can be decrypted and compared upon reception in their decrypted forms.

In an alternative embodiment, printer 100 may store the password without encrypting it. Host computer 102 may encrypt the password with an encryption prior to transmitting a data stream. Whereupon, printer 100 may receive the data stream from host computer 102, and unencrypt the encrypted password with an encryption key stored on printer 100. If the unencrypted password matches the password stored on printer 100, the printer 100 will print the requested document (preferably with security features as may be requested). In this embodiment, the encryption on host computer 102 can change as in the other embodiments; however, printer 100 need only change the encryption key to decrypt the new encryption on host computer 102. The encryption key may be changed to match the encryption on host computer 102 by preprogramming the algorithms to change the encryption and encryption keys to known values at predetermined times; the new encryption key may be transmitted by host computer 102 in the data stream; or they may be otherwise received from a user.

In addition to changing the encryption, printer 100 and host computer 102 may be programmed to change the stored password at a predetermined interval. For example, the printer 100 and host computer 102 may be programmed to change the password every hour. Accordingly, if printer 100 does not receive a new password upon the passage of the hour, the printer 100 will lock out printing functionality (the same way it can look out the printing functionality if it does not receive a password with a new encryption within a predetermined interval). In alternate embodiment, the printer 100 may require another password prior to the passage of the interval, or within a certain window of time. For example, the printer 100 may require a new password before one hour passes, or may require a new password from host computer 102 every forty-five minutes to hour. The window may also be employed to allow for variation in the clocks or counters of the host computer 102 and printer 100. For example, the window may be set at one second before and after a one hour time interval, allowing the host computer 102 clock to be within one second of the printer 100 clock.

The new password may be generated by the host computer 102 or printer 100 and transmitted between them. Alternatively, host computer 102 and printer 100 algorithms may have passwords or pre-stored, or may be configured to generate the same pseudorandom passwords from a set of known factors.

In an alternative embodiment, the printer 100 can receive a byte string from the host computer 102 that acts as a trigger (as the actual primary trigger or command, or as a trigger to look for a further command or second trigger in the variable data string) to change the password or the encryption of a password at a predetermined interval (as described above). In other words, when the printer 100 identifies the unique string, the printer 100 can be enabled to change the password or the encryption of a password at a predetermined interval.

The byte string, for example, can be a text string (or any other predetermined data or indicator). A "text string" can be part of the data stream being sent to the printer 100 to be printed as non-secure data on a document. When the printer firmware 106 is programmed to identify a certain text string to act as a trigger, it can scan the datastream for the particular string. As an example, it may be a date or time in the data to be printed (or the words "date" or "time" or any other alpha numeric combinations). When the printer firmware 106 detects this certain text string in the datastream, the printer firmware 106 can be programmed to change the password or encryption as described herein.

A "module," as may be used herein, can include, among other things, the identification of specific functionality represented by specific computer 102 software code of a software program. A software program may contain code representing one or more modules, and the code representing a particular module can be represented by consecutive or non-consecutive lines of code.

As will be appreciated by one skilled in the art, aspects of the present invention may be embodied/implemented as a computer 102 system, method or computer 102 program product. The computer 102 program product can have a computer 102 processor or neural network, for example, that carries out the instructions of a computer 102 program. Accordingly, aspects of the present invention may take the form of an entirely hardware embodiment, an entirely software embodiment, and entirely firmware 106 embodiment, or an embodiment combining software/firmware 106 and hardware aspects that may all generally be referred to herein as a "circuit," "module," "system," or an "engine." Furthermore, aspects of the present invention may take the form of a computer 102 program product embodied in one or more computer 102 readable medium(s) having computer 102 readable program code embodied thereon.

Any combination of one or more computer 102 readable medium(s) may be utilized. The computer 102 readable medium may be a computer 102 readable signal medium or a computer 102 readable storage medium. A computer 102 readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer 102 readable storage medium would include the following: an electrical connection having one or more wires, a portable computer 102 diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer 102 readable storage medium may be any tangible medium that can contain, or store a program for use by or in connection with an instruction performance system, apparatus, or device.

The program code may perform entirely on the user's computer 102, partly on the user's computer 102, completely or partly on the thermal printer 100, as a stand-alone software package, partly on the user's computer 102 and partly on a remote computer 102 or entirely on the remote computer 102 or server. In the latter scenario, the remote computer 102 may be connected to the user's computer 102 through any type of network, including a local area network (LAN) or a wide area network (WAN), or the connection may be made to an external computer 102 (for example, through the Internet using an Internet Service Provider).

The flowcharts/block diagrams in the Figures illustrate the architecture, functionality, and operation of possible implementations of systems, methods, and computer 102 program products according to various embodiments of the present invention. In this regard, each block in the flowcharts/block diagrams may represent a module, segment, or portion of code, which comprises instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer 102 instructions.

While several embodiments of the invention have been discussed, it will be appreciated by those skilled in the art that various modifications and variations of the present invention are possible. Such modifications do not depart from the spirit and scope of the present invention.

What is claimed is:

1. A system for securing a printer, comprising:
   a printer, having a nontransitory storage medium, configured to:
     store a password encrypted with a first encryption scheme, the stored password encrypted with the first encryption scheme matching a host password encrypted with the first encryption scheme, the host password stored on a host computer;
     re-encrypt the stored password with a second encryption scheme upon the passage of a predetermined interval, wherein the second encryption scheme is different than the first encryption scheme, wherein the passage of the predetermined interval is configured to coincide with a re-encryption of the host password stored on the host computer with the second encryption scheme, such that the stored password with the second encryption scheme matches the host password encrypted with the second encryption scheme;
     receive a data stream from the host computer, said data stream containing the host password encrypted with the second encryption scheme;
     determine whether the host password encrypted with the second encryption scheme of the received data stream matches the stored password encrypted with the second encryption scheme; and
     print a document upon determining that the host password encrypted with the second encryption scheme of the received data matches the stored password encrypted with the second encryption scheme.

2. The system of claim 1, further comprising:
   a host computer, having a nontransitory storage medium, configured to:
     store the password encrypted with the first encryption scheme;
     re-encrypt the stored password with the second encryption scheme upon the passage of the predetermined interval;
     transmit the data stream to the printer, wherein the data stream contains the password encrypted with the second encryption scheme.

3. The system of claim 1 wherein the printer is further configured to lock at least one function of the printer if a second password is not received prior to the passage of a second predetermined interval.

4. The system of claim 3, further comprising:
   a host computer, having a nontransitory storage medium configured to
     generate the second password; and
     transmit the second password to the printer upon the passage of the second predetermined interval.

5. The system of claim 1, wherein the predetermined interval is the passage of a period of time.

6. The system of claim 1, wherein the predetermined interval is reception of a command.

7. The system of claim 6, wherein the command is received from the host computer, wherein the command further contains the first encrypted password.

8. The system of claim 5, wherein the period of time is determined by a user.

* * * * *